United States Patent
D'Alessandro et al.

(10) Patent No.: US 8,100,454 B2
(45) Date of Patent: Jan. 24, 2012

(54) C-SHAPED CONSOLE ASSEMBLY FOR USE IN A VEHICLE

(75) Inventors: Anthony D'Alessandro, Ray Township, MI (US); Daniel Vander Sluis, Rochester Hills, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 43 days.

(21) Appl. No.: 12/340,952

(22) Filed: Dec. 22, 2008

(65) Prior Publication Data

US 2010/0156131 A1 Jun. 24, 2010

(51) Int. Cl.
*B60R 11/06* (2006.01)

(52) U.S. Cl. .................................................. 296/37.8

(58) Field of Classification Search ............. 296/37.8, 296/37.1, 24.34; 224/539, 540, 557, 926
See application file for complete search history.

(56) References Cited

U.S. PATENT DOCUMENTS

| | | | | |
|---|---|---|---|---|
| 4,087,126 A * | 5/1978 | Wynn | | 296/37.8 |
| 5,680,974 A * | 10/1997 | Vander Sluis | | 224/281 |
| 5,732,994 A * | 3/1998 | Stancu et al. | | 296/37.8 |
| 5,845,965 A * | 12/1998 | Heath et al. | | 297/188.19 |
| 5,887,485 A * | 3/1999 | VanOrder et al. | | 74/473.15 |
| 6,038,937 A * | 3/2000 | Van Order et al. | | 74/473.1 |
| 6,375,235 B1 * | 4/2002 | Mehmen | | 292/128 |
| 6,419,314 B1 * | 7/2002 | Scheerhorn | | 297/188.19 |
| 7,237,816 B1 * | 7/2007 | Singh et al. | | 296/24.34 |
| 7,258,381 B2 * | 8/2007 | Sturt et al. | | 296/24.34 |
| 7,370,898 B2 * | 5/2008 | Sturt et al. | | 296/24.34 |
| 7,413,229 B2 * | 8/2008 | Kukucka et al. | | 296/24.34 |
| 7,416,235 B2 * | 8/2008 | Rajappa et al. | | 296/37.8 |
| 7,429,068 B2 * | 9/2008 | Busha et al. | | 296/24.34 |
| 7,431,365 B2 * | 10/2008 | Sturt et al. | | 296/24.34 |
| 7,513,553 B2 * | 4/2009 | Singh et al. | | 296/37.8 |
| 7,533,918 B2 * | 5/2009 | Spykerman et al. | | 296/24.34 |
| 7,591,498 B2 * | 9/2009 | Busha et al. | | 296/24.34 |
| D611,400 S * | 3/2010 | Suge et al. | | D12/345 |
| 7,739,963 B2 * | 6/2010 | Chou et al. | | 108/44 |
| 7,766,408 B2 * | 8/2010 | Lota et al. | | 296/37.1 |
| 7,770,954 B2 * | 8/2010 | D'Alessandro | | 296/24.34 |
| 2005/0035618 A1 * | 2/2005 | Toth et al. | | 296/24.34 |
| 2005/0046263 A1 * | 3/2005 | Wright | | 297/411.3 |
| 2007/0075558 A1 * | 4/2007 | Kim et al. | | 296/24.34 |
| 2008/0007079 A1 * | 1/2008 | Sturt et al. | | 296/24.34 |
| 2008/0079278 A1 | 4/2008 | Rajappa et al. | | |
| 2008/0079279 A1 | 4/2008 | Spykerman et al. | | |
| 2008/0129071 A1 * | 6/2008 | Hipshier et al. | | 296/37.8 |
| 2009/0072568 A1 * | 3/2009 | Luginbill et al. | | 296/37.8 |
| 2009/0174206 A1 * | 7/2009 | Vander Sluis et al. | | 296/24.34 |

(Continued)

*Primary Examiner* — Kiran B Patel
(74) *Attorney, Agent, or Firm* — Reising Ethington P.C.

(57) ABSTRACT

A vehicle interior assembly is provided with a console having a side-wall coupled to the console and at least one storage bin that slidingly engages the side-wall. A user slides the storage bin forwards or rearwards to cover and/or uncover the storage bin. The at least one storage bin is accessible to a user in the front or rear of a vehicle at least in front or behind the lid, respectively. The at least one storage bin slides along one or more tongues of the side-wall to expose, in part or in whole, the storage bin, thereby utilizing compact console design while providing space creation and ergonomics for a vehicle driver and/or passengers. An upper portion of the side-wall slidingly engages a lower portion of the side-wall to allow a user to adjust an armrest of the upper portion and/or to cover and uncover the at least one storage bin.

9 Claims, 10 Drawing Sheets

U.S. PATENT DOCUMENTS

2009/0174207 A1* 7/2009 Lota .......................... 296/24.34
2009/0218840 A1* 9/2009 Vasko et al. ............... 296/24.34
2009/0278370 A1* 11/2009 Depue ....................... 296/24.34
2010/0156131 A1* 6/2010 D'Alessandro et al. ..... 296/37.8

* cited by examiner

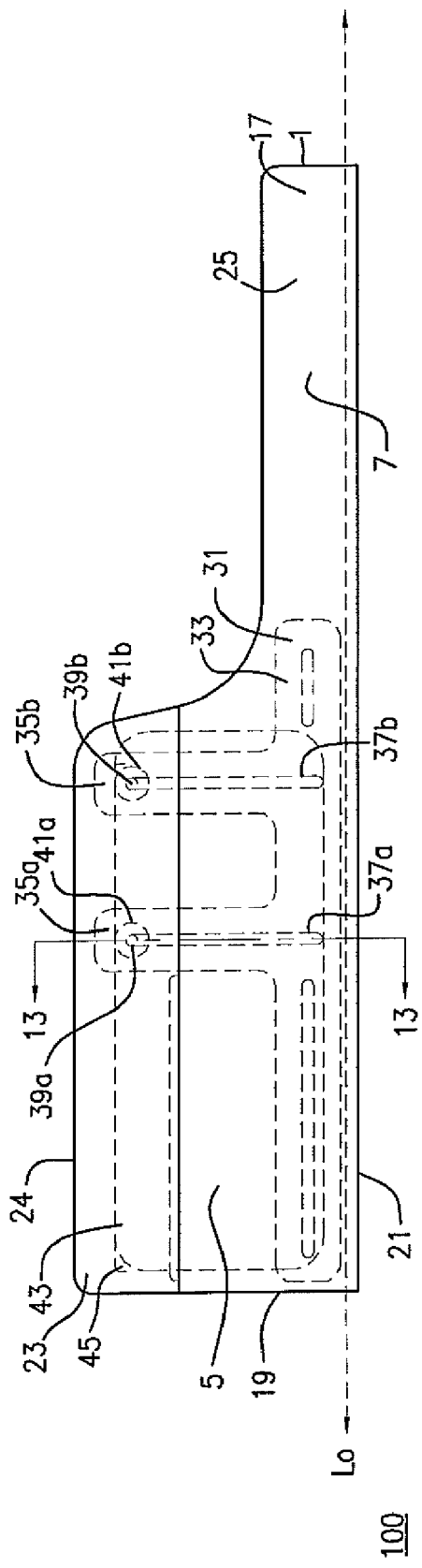
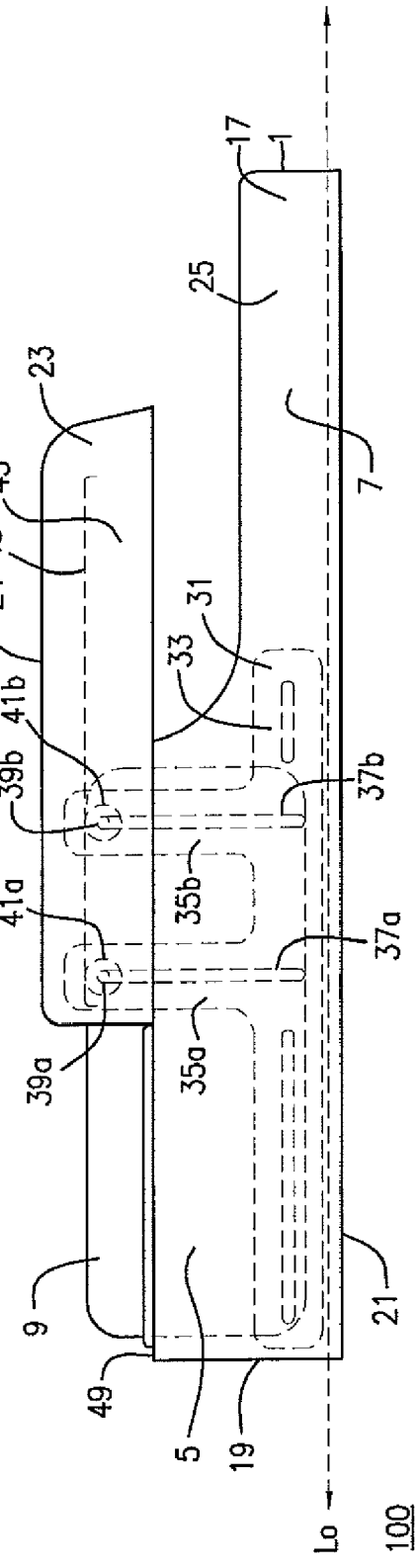

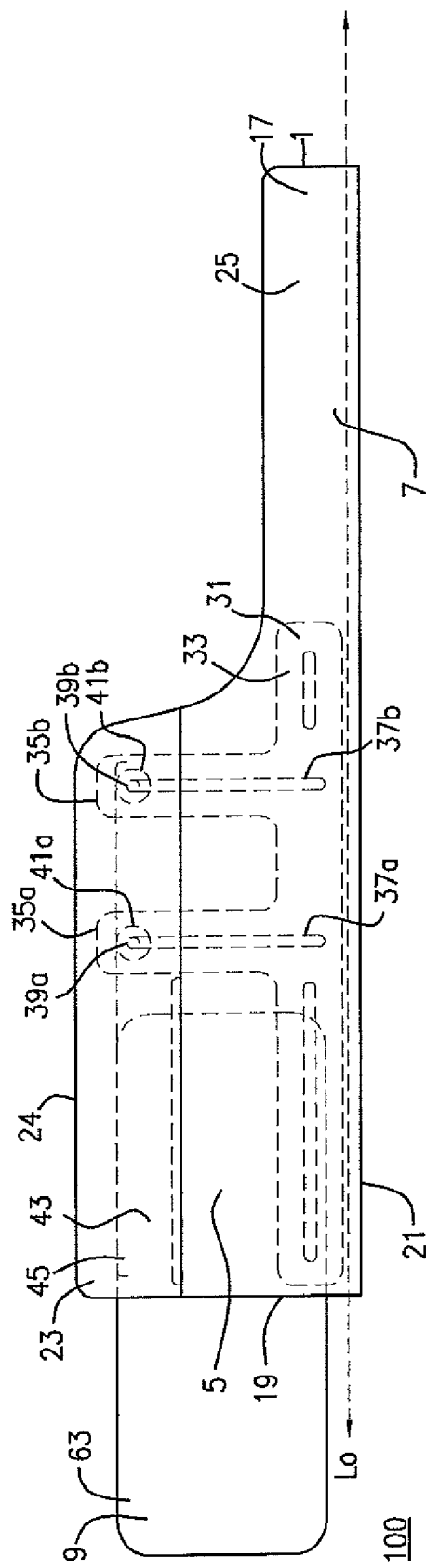
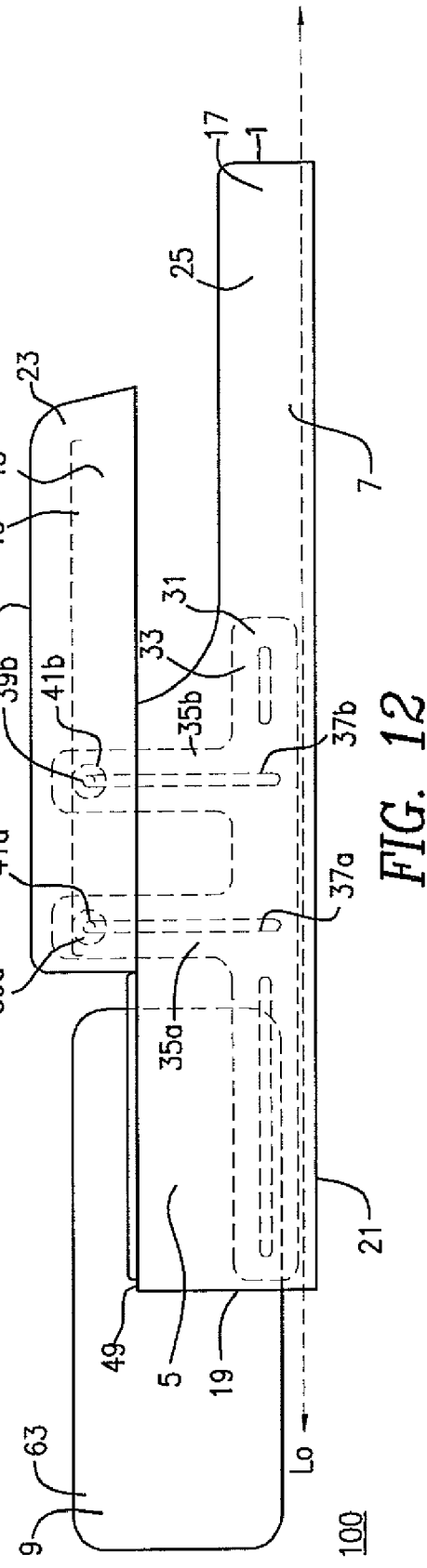

C-SHAPED CONSOLE ASSEMBLY FOR USE IN A VEHICLE

FIELD OF THE INVENTION

The present invention is directed to consoles that employ a console lid and/or a sliding compartment to expose and hide one or more compartments for storage or use in a vehicle, or the like.

BACKGROUND OF THE INVENTION

Vehicle consoles are usually located in the center of a vehicle between driver and passenger seats. The console primarily is composed of a stack up of inner and outer plastic walls. Because the console typically employs two side walls each on a respective driver side and passenger side, the console works with storage and spatial constraints that limit the ergonomic potential and storage potential of the console. Consoles that typically employ a two side wall structure reduce the space available to a user because the console occupies the space. The consoles traditionally employ thick walls for additional support. The walls typically include additional structure for support, such as a plurality of wall layers, thick molded plastics/metals, etc.

The console typically employs pivoting and/or sliding components for opening and closing storage bins or compartments within the console of the vehicle. However, the traditional pivoting and/or sliding components contribute to the reduction in potential space available to a driver and/or passengers because the traditional components are attached to the two side walls of the console. The pivoting component (e.g., a console lid or an armrest lid) is typically attached to the console via a hinge placed on a terminal end of the lid. The lid may then pivot around the attached hinge to open and close over a storage bin. When in the open position, the lid typically lies upwards substantially transverse to the length of the console.

Opening or closing a hinged lid over a storage bin requires complicated arm movements by the user, which in combination with the upwards and transverse open position of the lid prevents a driver and/or passenger from enjoying an ergonomic experience when accessing the storage bin or compartment. For instance, when the hinged lid is in the open position, the hinge does not permit the lid from pivoting entirely out of the way of the user and becomes an obstacle and a distraction. Such a distraction can lead to an accident or injury. Additionally, when the hinged lid is in the upward transverse position (i.e., open), the lid occupies space that a passenger or driver would otherwise use as an armrest, thereby placing a driver or passenger in an uncomfortable position.

When employing a sliding portion, such as a sliding armrest or lid, to access a storage bin, the lid is typically attached to the console via sliding rails/channels placed within the two side wall structure on respective sides of the lid and console. Because the lid is attached to the console on each side of the lid (i.e., the lid is attached to the two walls of the console), the additional materials needed to attach the lid further reduce the potential space available for storage or for driver and/or passenger comfort. The lid may then slide along the sliding rails to open and close the storage bins. In some cases, the sliding rails may be curved so that the lid is oriented in a substantially vertical position when open, so as to mimic comparable pivoting portions. As with the pivoting portions, moving the sliding lid into the open position requires complicated arm movements by the user and results in the aforementioned ergonomic problems. Sliding components can further employ hinges, and such components also exhibit complicated arm movements and ergonomic problems.

When consoles employing pivoting and/or sliding components are manufactured, the pivoting and/or sliding components occupy excess space in the console, especially when attached to the console on both side walls of the console. When employing various storage bins or compartments of different sizes and/or shapes, the size and/or shape of the respective pivoting and/or sliding components must change to appropriately cover the storage bins or compartments. For instance, if a driver orders a vehicle console with a large storage bin, the pivoting and/or sliding component(s) of the console must be large enough to completely cover or close the storage bin. The console is constructed such that each pivoting and/or sliding component occupies a respective portion of the console to cover the associated storage bin or compartment. Because the pivoting and/or sliding component is operable to move between a respective open or closed position, additional console space is reserved for such movement of the pivoting and/or sliding component. Because the pivoting and/or sliding component must be securely fastened to the console, the pivoting and/or sliding components are typically attached to both side walls of the console. Such a construction results in a bulky console, which may limit the space provided to a vehicle driver and/or passenger, thereby reducing the comfort of the driver and/or passenger. Such a console has less potential for additional or larger storage bins or compartments, and, therefore, limits the possibility for space creation in the console. Such a console also has less potential for additional space provided to the driver and/or passenger because the console employs two side walls. Because these consoles utilize space inefficiently, such consoles increase the cost of construction/manufacture due to the excess materials required, and reduce the ergonomic potential of the console for driver and/or passenger comfort.

Providing opportunities for space creation and utilizing more compact console design are important for effective and comfortable user interaction. Console portions and/or components that take up excess space can result in inefficiencies, such as increased cost, inefficient use of space, or the like, during manufacture and/or operation, and can result in discomfort for a driver and/or passengers of a vehicle. Providing ergonomic characteristics, such as increased space availability, simpler arm movements for opening and closing storage bins, etc., are important for effective and comfortable user interaction. Complicated, uncomfortable movements of console components can result in inefficient operation, and can place a driver and passengers into distracting, unsafe situations, which can result in accidents, injury, or the like.

Therefore, there is a need in the art for a console assembly for providing efficient space creation for a driver and/or passenger and employing more compact console design while also providing. There is a need in the art for a console assembly for providing ergonomic characteristics to a user and requiring simpler arm movements for operation.

SUMMARY OF THE INVENTION

In accordance with one or more aspects of the present invention, vehicle interior assemblies are provided for exposing and hiding compartments (also referred to as storage bins). In particular, the present invention relates to vehicle interior assemblies that provide compact console design and space creation (e.g., because console portions and/or components use less overall space in and/or on a console, more space is created for storage bins and/or driver/passenger comfort)

for storage bins that slide along the console to expose and hide compartments in the console while also providing to at least one user front (e.g., to a driver and/or front seat passenger) and rear (e.g., to a back seat passenger) access to the storage bin. A sliding upper portion may include a lid that acts as an armrest for a user and may also cover and uncover the storage bin.

In accordance with one or more embodiments of the present invention, a vehicle interior assembly includes: a console having front and rear terminal ends defining a longitudinal axis; a side-wall coupled to a first side of the console; and at least one storage bin that slidingly engages the side-wall and slides in frontward and rearward directions substantially parallel to the longitudinal axis of the console along the side-wall to open and close the storage bin and/or to provide front and rear access to the at least one storage bin, wherein the side-wall extends along and proximate to a first side of the at least one storage bin, and there is no side-wall proximate to a second side of the at least one storage bin that is opposite to the first side, for providing space laterally to the console and/or a user.

The side-wall may be substantially C-shaped when viewed in cross-section to the longitudinal axis of the console. The C-shaped side-wall may include an upper portion and a lower portion, wherein the upper portion may include a lid extending over the at least one storage bin to cover and uncover the at least one storage bin, and/or to act as an armrest for the user.

The lid of the upper portion of the C-shaped side-wall may cover and uncover the at least one storage bin as a function of how far the at least one storage bin is slid in the frontward and rearward directions. The lid may be integrally molded to the upper portion.

The at least one storage bin may slidingly engage the C-shaped side-wall of the console at positions between the front terminal end of the console and the rear terminal end of the console. The at least one storage bin may slidingly engage the lower portion of the side-wall. Alternatively or additionally, the at least one storage bin may slidingly engage a surface of the lower portion of the side-wall that is adjacent to the at least one storage bin, and the at least one storage bin may slidingly engage a surface of the console that is underneath a base of the at least one storage bin.

A side of the at least one storage bin facing away from the side-wall may include a chamfered contour to allow the user to access the at least one storage tray. A side, that is facing towards the side-wall, of the at least one storage bin may include a first groove, and the surface of the lower portion of the side-wall may include a first tongue, wherein the first groove of the at least one storage bin is in communication with the first tongue of the side-wall such that the at least one storage bin slides along and remains in sliding engagement with the first tongue of the side-wall. A base of the at least one storage bin may include a second groove, and the surface of the console may include a second tongue, wherein the second groove is in communication with the second tongue such that the at least one storage bin slides along and remains in sliding engagement with the second tongue of the console. The first and/or second tongue may be integrally molded onto the C-shaped side-wall and/or the console.

The console may include ample space for storage. At least one storage tray may be disposed on the console; and at least one storage pocket may be disposed on the lower portion of the side-wall facing towards the at least one storage bin. The at least one storage tray may be at least one of: removably attached to the console; and integrally molded into the console. The at least one storage tray may be accessible when the at least one storage bin is slid in at least one of the frontward direction and the rearward direction away from the at least one storage tray.

In accordance with one or more further embodiments of the present invention, a vehicle interior assembly includes: a console having front and rear terminal ends defining a longitudinal axis; a side-wall coupled to the console and having a lower portion and an upper portion including a lid, wherein the side-wall is substantially C-shaped when viewed in cross-section to the longitudinal axis of the console; and at least one storage bin that slidingly engages the C-shaped side-wall therein and slides in at least frontward and rearward directions substantially parallel to the longitudinal axis of the console underneath and away from the lid of the C-shaped side-wall to respectively cover and uncover the at least one storage bin, wherein the at least one storage bin slides frontward to expose the at least one storage bin in front of the lid, and the at least one storage bin slides rearward to expose the at least one storage bin rearward of the lid.

The upper portion of the C-shaped side-wall may slidingly engage the lower portion of the C-shaped side-wall and may slide in at least frontward and rearward directions substantially parallel to the longitudinal axis of the console. The upper portion may allow a user to slide the upper portion to at least one predetermined position to use the lid as an armrest. The upper portion may include a channel and the lower portion may include an engagement edge such that the channel may be in substantial communication with the engagement edge, wherein the channel may be sized and shaped to prevent the upper portion from sliding beyond a predetermined distance. The upper portion may be integrally molded to the lower portion to prevent sliding thereon.

The lid of the upper portion may cover the at least one storage bin at positions substantially along a length of the console.

In at least one embodiment, the assembly may further include a bracket system including a first extension disposed within the lower portion and at least one second extension extending transversely from the first extension through the engagement edge of the wall and into the channel for permitting the upper portion to slidingly engage the lower portion thereon. The at least one second extension may include at least one roller disposed thereon and in communication with the channel to permit the upper portion to slide along the engagement edge of the lower portion. The bracket system may be substantially F-shaped. The F-shaped bracket may stiffen the console so that only one side-wall is needed to support the at least one storage bin and/or the lid.

In at least another embodiment, the assembly may further include a sliding rail that may be disposed within the channel and that may slidingly engage the at least one second extension. The sliding rail may be sized and shaped to prevent the upper portion from sliding beyond a predetermined distance. The at least one second extension may include at least one roller disposed thereon and in communication with the sliding rail to permit the upper portion to slide along the engagement edge of the lower portion.

The types of vehicles in which the present invention may be employed are numerous and include: automobiles, planes, trains, trucks, buses, boats, helicopters, submersible vehicles, spacecraft, etc.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown, but rather only by the claims. The drawings may not be to scale, and the aspects of the drawings may not be to scale relative to each other. To assist those of ordinary skill in the relevant art in making and using the subject matter hereof, reference is made to the appended drawings and figures, wherein:

FIG. 7 is a side view of the vehicle interior assembly of FIG. 1 in accordance with at least one aspect of the present invention.

FIG. 8 is a side view of the vehicle interior assembly of FIG. 2 in accordance with at least one aspect of the present invention.

FIG. 11 is a side view of the vehicle interior assembly of FIG. 5 in accordance with at least one aspect of the present invention.

FIG. 12 is a side view of the vehicle interior assembly in accordance with at least one aspect of the present invention.

DETAILED DESCRIPTION OF THE PRESENT INVENTION

Vehicle interior assemblies are disclosed herein for exposing and hiding compartments (also referred to as storage bins). The assemblies may be employed in automobiles, planes, trains, trucks, buses, boats, helicopters, submersible vehicles, spacecraft, or the like. In particular, the present invention relates to vehicle interior assemblies that provide compact console design and space creation (e.g., because console portions and/or components use less overall space in and/or on a console, more space is created for storage bins and/or driver/passenger comfort) for storage bins that slide along the console to expose and hide compartments in the console while also providing front (e.g., to a driver and/or front seat passenger) and rear (e.g., to a back seat passenger) access to the storage bin. A sliding upper portion may include a lid that acts as an armrest for a user and may also cover and uncover the storage bin.

Figure 1:
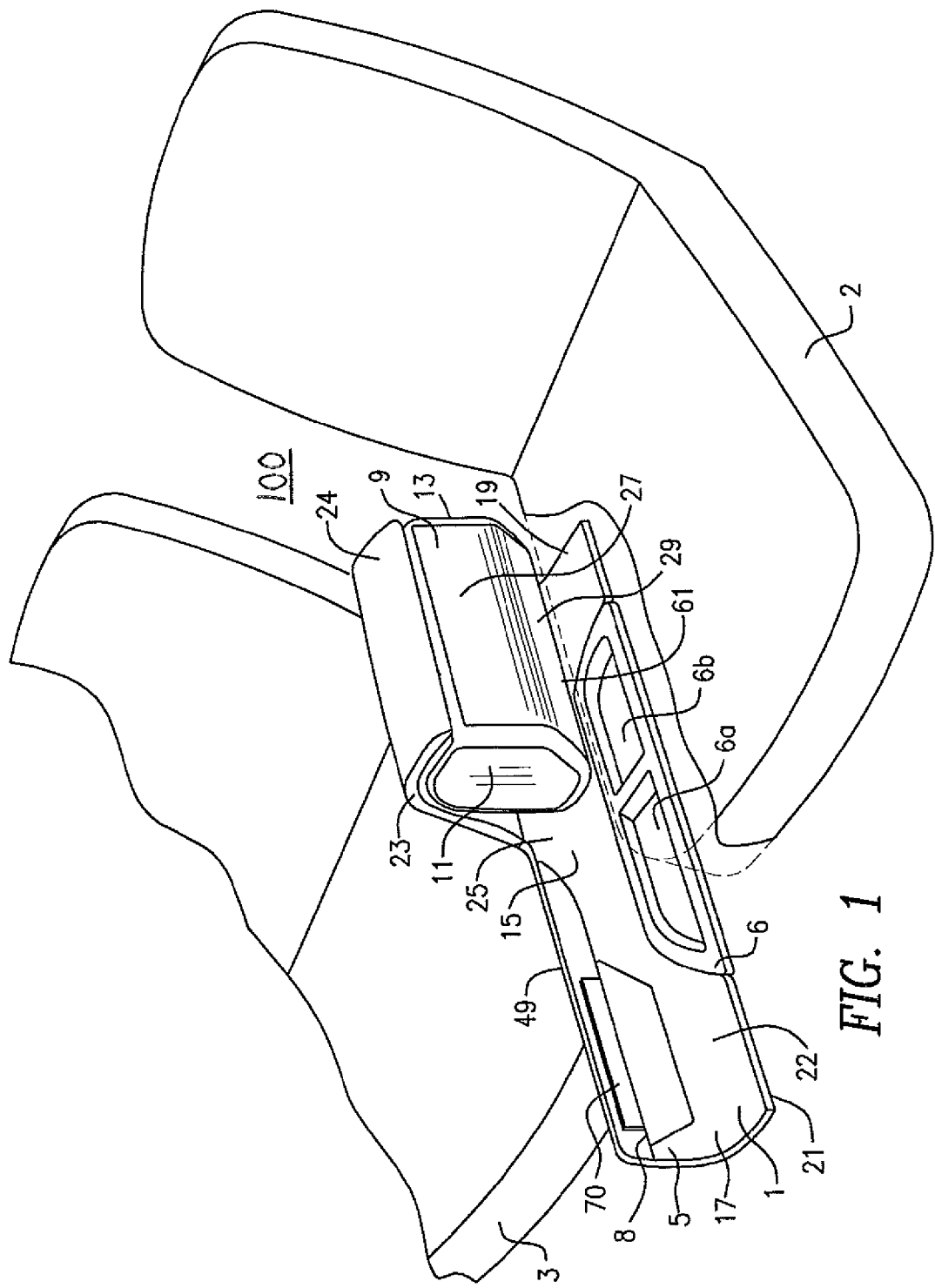
FIG. 1 is a perspective view of a vehicle interior assembly employing a console, a C-shaped side-wall, a sliding storage bin in a closed position, and a tray in accordance with at least one aspect of the present invention.
Figure 2:
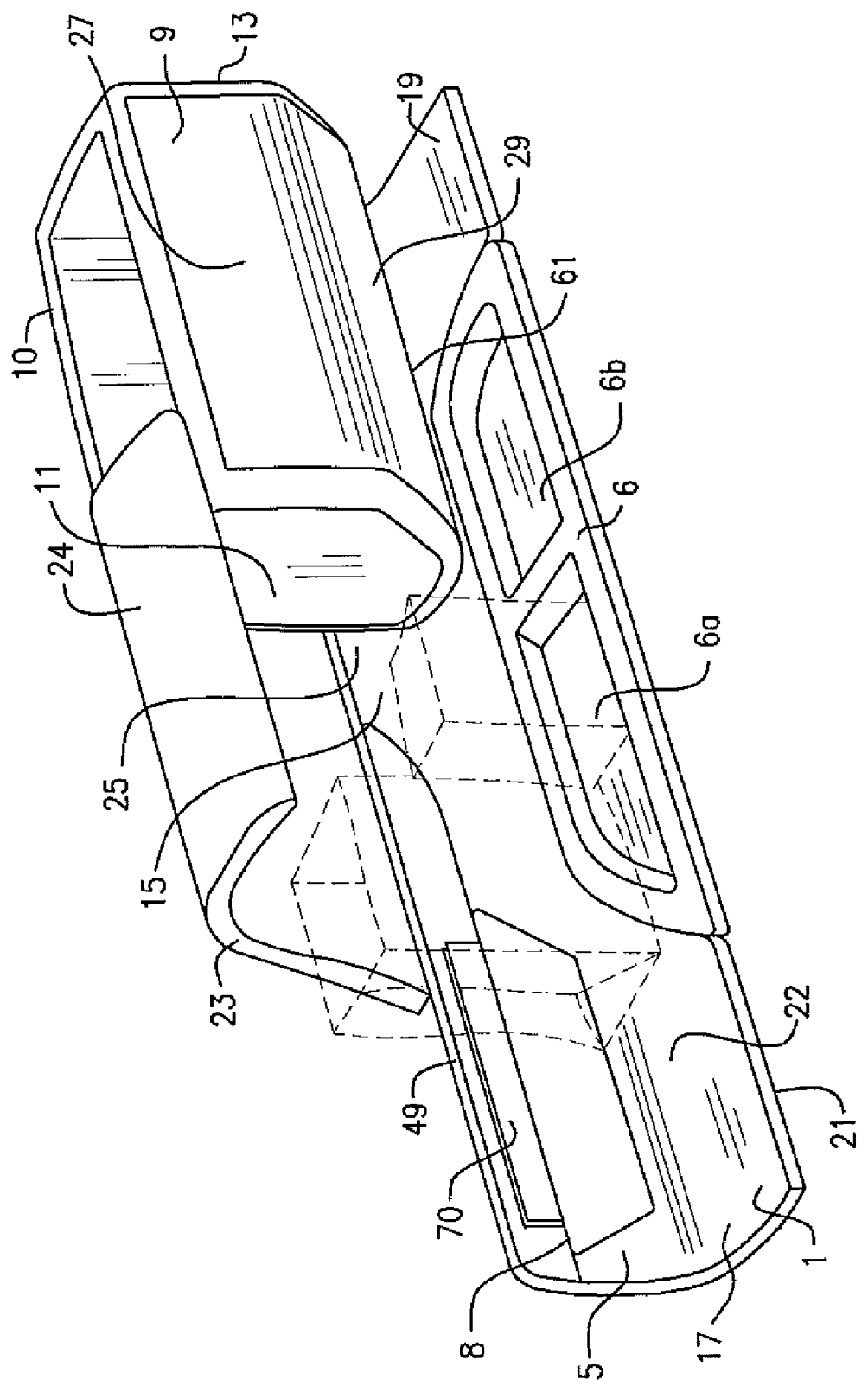
FIG. 2 is a perspective view of the vehicle interior assembly employing a console, a C-shaped side-wall, a sliding armrest in a forward position such that a sliding storage bin is open, and a tray in accordance with at least one aspect of the present invention.

FIG. 1 is a perspective view of a vehicle interior assembly 100 in accordance with at least one aspect of the present invention. The console 1 is disposed in a vehicle adjacent to driver and/or passenger seats, such as seat 2 or seat 3, etc., and includes a side-wall 5, at least one storage bin 9 (as shown in FIGS. 1-13), and front and rear terminal ends 17, 19 of console 1 defining a longitudinal axis, Lo (as shown in FIGS. 7-12). Those skilled in the art will recognize that in the context of, for example, an automobile application, any driver's and/or passenger's seat 2, 3 may be used adjacent to the console 1 of assembly 100. The console 1 may be connected to the vehicle via the front and rear terminal ends 17, 19, an underside 21, and/or a side surface 7. The console 1 may be formed from various materials, such as metal, plastic, polymer, rubber, etc. Those skilled in the art will recognize that any mechanism may be used to connect the console 1 to the vehicle, such as bonding, bolting, molding, clamping, etc.

In accordance with one or more embodiments as shown in FIGS. 1-6, the side-wall 5 is coupled to the console 1 such that available lateral width is increased for the console 1, driver, and/or passenger(s). The console 1 occupies less lateral width because less material is used to implement the side-wall 5. For example, the console 1 employs only one side-wall 5 and not two side-walls. Thus, the console 1 occupies less lateral space as compared to traditional consoles known to those skilled in the art that employ two side-walls for support. Because the console 1 employs compact console design, the use of one side-wall 5 provides a reduction in manufacturing/repair costs, increased perception of lightness, and improved ergonomics, such as space creation for user comfort, storage, openness in the vehicle interior, etc. The side-wall 5 may be substantially C-shaped when viewed in cross-section to the longitudinal axis, Lo, of the console 1. The side-wall 5 may include an upper portion 23 and a lower portion 25 extending from the upper portion 23. In at least one embodiment, the side-wall 5 may include the console 1, particularly in a C-shaped arrangement, such that the lower portion 25 extends into console 1. The side-wall 5 may be integrally molded to the console 1 such that the side-wall 5 includes the console 1 and extends underneath the at least one storage bin 9. The side-wall 5 and/or one or more of the components of the side-wall 5, such as lid 24, upper portion 23, lower portion 25, etc., may be formed from various materials, such as metal, plastic, polymer, rubber, etc.

As shown in FIGS. 1-6, the upper portion 23 may include a lid 24 that may cover the at least one storage bin 9, and the lid 24 of the upper portion 23 may act as an armrest for a user. The lid 24 may cover and uncover the at least one storage bin 9 as a function of how far the at least one storage bin 9 is slid in the frontward and rearward directions along the longitudinal axis, Lo. For example, as shown in FIG. 1, the lid 24 of the upper portion 23 may completely cover, and thus close, the at least one storage bin 9. As shown in FIGS. 2-6, a user may slide the at least one storage bin 9 forward or rearward such that the lid 24 may partly cover or may substantially not cover the at least one storage bin 9. The lid 24 may be integrally molded to the upper portion 23.

As best seen in FIGS. 1-2, and 4-6, the upper portion 23 of vehicle interior assembly 100 may be slidingly engaged with the lower portion 25 (e.g., along the engagement edge 49 of lower portion 25) such that the upper portion 23 (and lid 24 if employed) may slide frontwards and rearwards, substantially parallel to the longitudinal axis, Lo, of console 1. For instance, a user of the console 1 may slide the lid 24 and upper portion 23 to desired positions along the console 1 for comfortable use as an armrest. The moveable lid 24 and upper portion 23 may be desirable, particularly when different users prefer that the console 1 be at different lateral positions at various times. For example, if the users are of a different size and shape, the users may prefer different positions for the lid 24 along the console 1 to achieve ergonomic goals and comfort.

Figure 3:
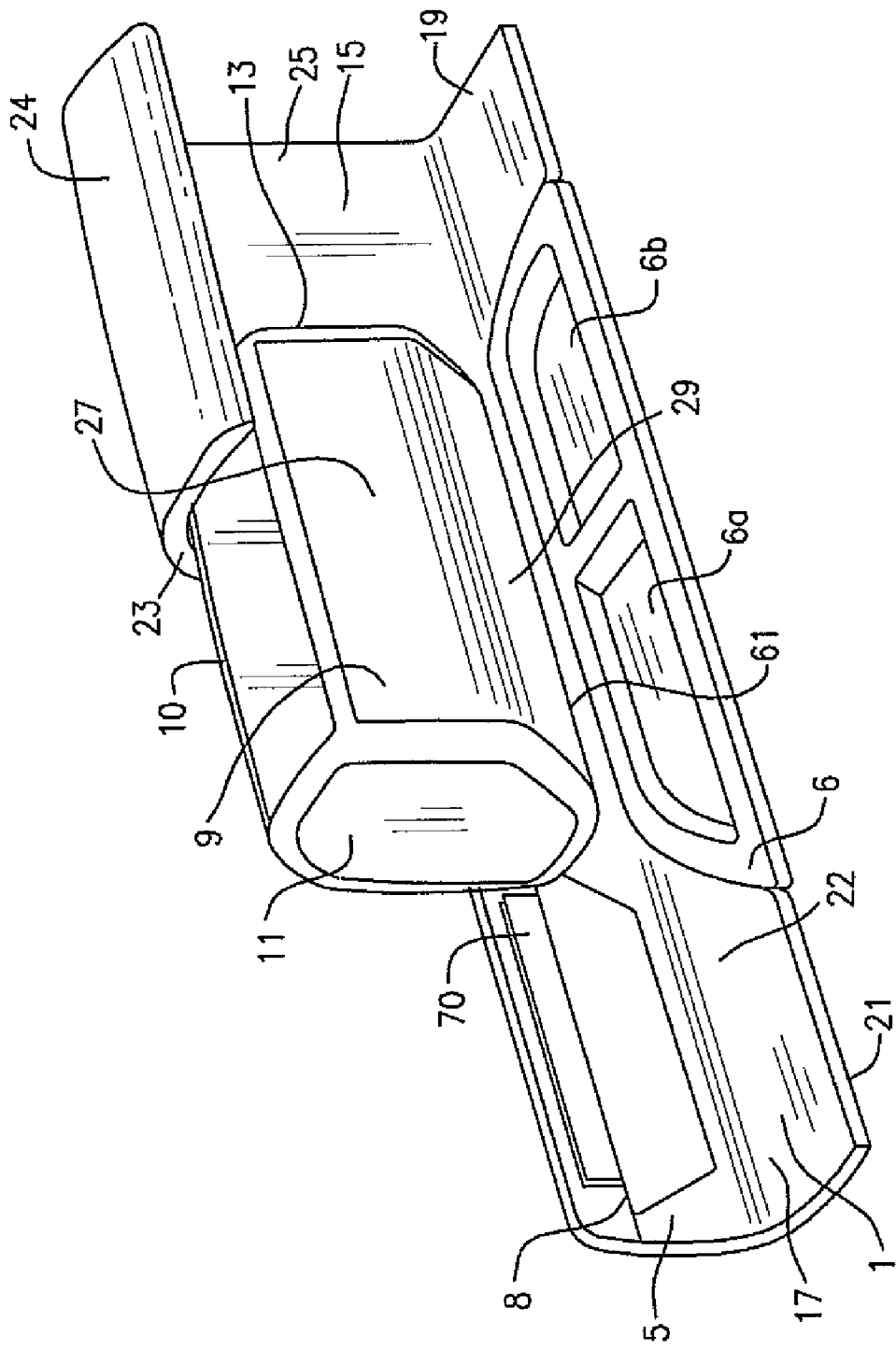
FIG. 3 is a perspective view of the vehicle interior assembly employing a console, a C-shaped side-wall, a sliding storage bin in a forward open position, and a tray in accordance with at least one aspect of the present invention.

Alternatively, as shown in FIG. 3, the upper portion 23 of a vehicle interior assembly 110 may be integrally molded to the lower portion 25 of the side-wall 5 such that the upper portion 23, and thus the lid 24, may not slide along the lower portion 25. For instance, if a user of the console 1 prefers the lid 24 of the upper portion 23 in a particular location along the console 1, the user may want to permanently situate the lid 24.

In accordance with the one or more embodiments as shown in FIGS. 1-6, the at least one storage bin 9 includes a top surface 10, a front terminal end 11, and a rear terminal end 13, and the at least storage bin 9 slidingly engages the side-wall 5 of the console 1 such that the at least one storage bin 9 is operable to slide substantially in a frontward or rearward direction along the side-wall 5. The at least one storage bin 9 provides ample storage. When exposed, a user may use the storage bin 9 for placing items, such as, drinks, books, digital media, writing utensils, papers, etc. As best seen in FIGS. 2-6, a driver and/or passenger can access the at least one storage bin or compartment 9 via a top surface 10 of the at least one storage bin 9. The at least one storage bin 9 slidingly engages the side-wall 5 of the console 1 at positions between the front terminal end 17 of the console 1 and the rear terminal end 19 of the console 1. When the driver and/or passenger is done using the at least one storage bin 9, the driver and/or passenger may slide the at least one storage bin 9 and/or the lid 24 of the upper portion 23 such that the at least one storage bin 9 is in a closed position (as shown in FIG. 1). A driver and/or passenger slides the at least one storage bin 9 in the forwards direction, towards the front terminal end 17 of the console 1, to open or close, in part or in whole, the storage bin or compartment 9 as shown in FIGS. 1-6. Sliding the at least one storage bin 9 forwards may also, for example, allow a user in the front of a vehicle to access the at least one storage bin 9. A driver and/or passenger slides the at least one storage bin 9 in the rearwards direction, towards the back terminal end 19 of the console 1, to open or close, in part or in whole, the storage bin or compartment 9. Sliding the at least one storage bin 9 rearwards may also, for example, allow a user in the back of a vehicle to access the at least one storage bin 9. The at least one storage bin 9 may be formed from metal, plastic, polymer, rubber, etc.

As shown in FIGS. 1-6, a side 27 of the at least one storage bin 9 facing away from the side-wall 5 may include a chamfered contour 29 to allow the user to have access to additional space, such as at least one storage tray 6, or the like.

As best seen in FIGS. 1-6, at least one storage tray 6 may include one or more storage trays, such as two trays 6a, 6b. The storage tray 6a may be in front, be behind, and/or be adjacent to the storage tray 6b in longitudinal alignment along longitudinal axis, Lo. The storage trays 6a, 6b may be disposed in the same surface 22 of the console 1. The at least one storage tray 6 may be removably attached to the console 1, or alternatively, the at least one storage tray 6 may be integrally molded into the console 1. The at least one storage tray 6 may always be exposed for use, or alternatively, the at least one storage tray 6 may be covered, in part or in whole, by the at least one storage bin 9. When a driver and/or passenger slides the at least one storage bin 9 over the at least one tray 6, the at least one tray may be covered partly or in whole. When the driver and/or passenger slides the at least one storage bin 9 away from the at least one tray 6, the at least one tray 6 may be exposed to additional space for storage of items may be revealed. When the bin 9 is moved or slid away from the tray 6, then items that might otherwise be too large to fit in the at least one tray 6 (with the bin 9 positioned over the at least one tray 6) may be accommodated. Additionally or alternatively, any other method or arrangement of trays, such as cup trays, bins, etc., known to those skilled in the art may be employed, such as within the at least one storage bin 9, on the side-wall 5, etc. The at least one tray 6 may be formed from various materials, such as metal, plastic, polymer, rubber, metal embedded in plastic, etc.

Figure 4:
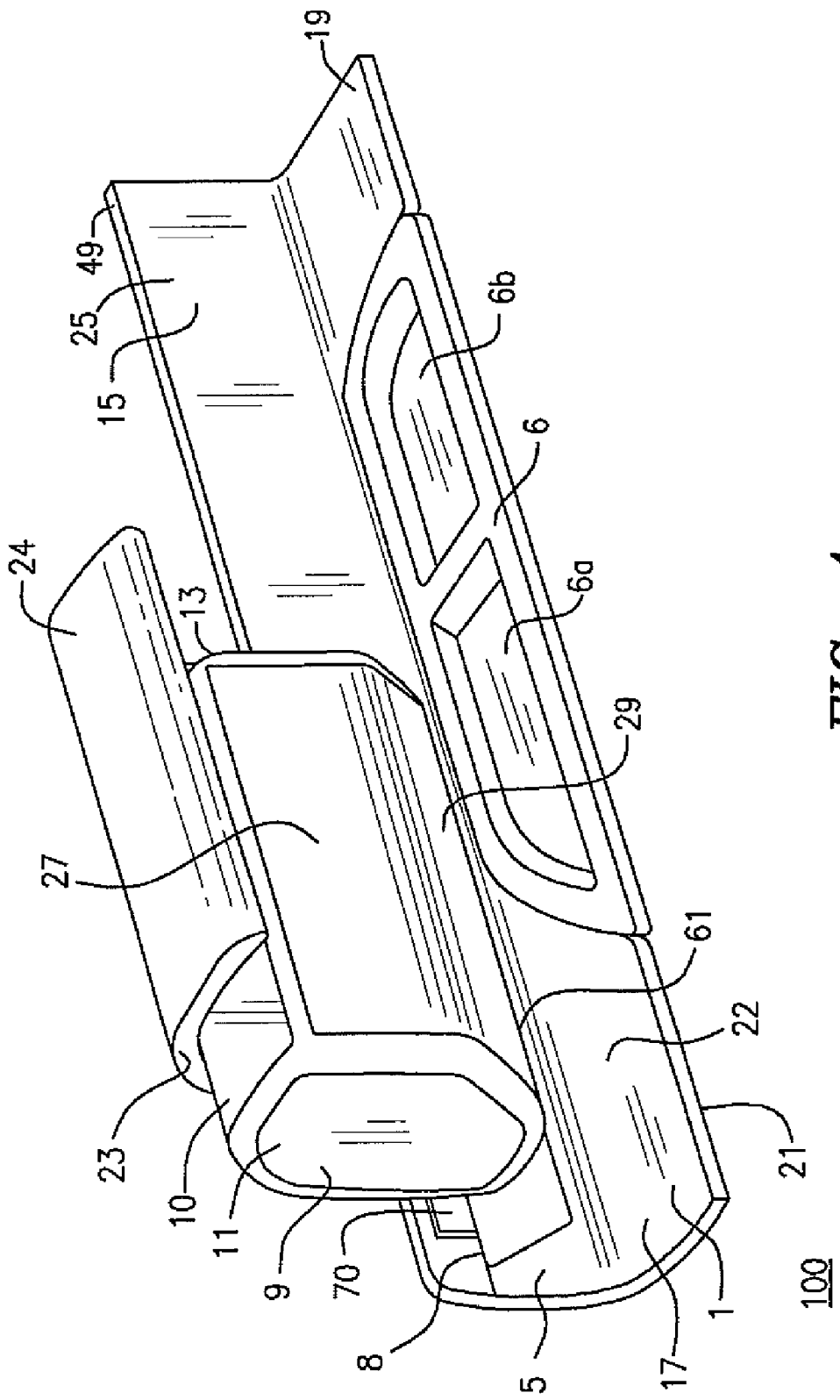
FIG. 4 is a perspective view of the vehicle interior assembly employing a console, a C-shaped side-wall, a sliding storage bin in a partially or hybrid forward open position, and a tray in accordance with at least one aspect of the present invention.
Figure 5:
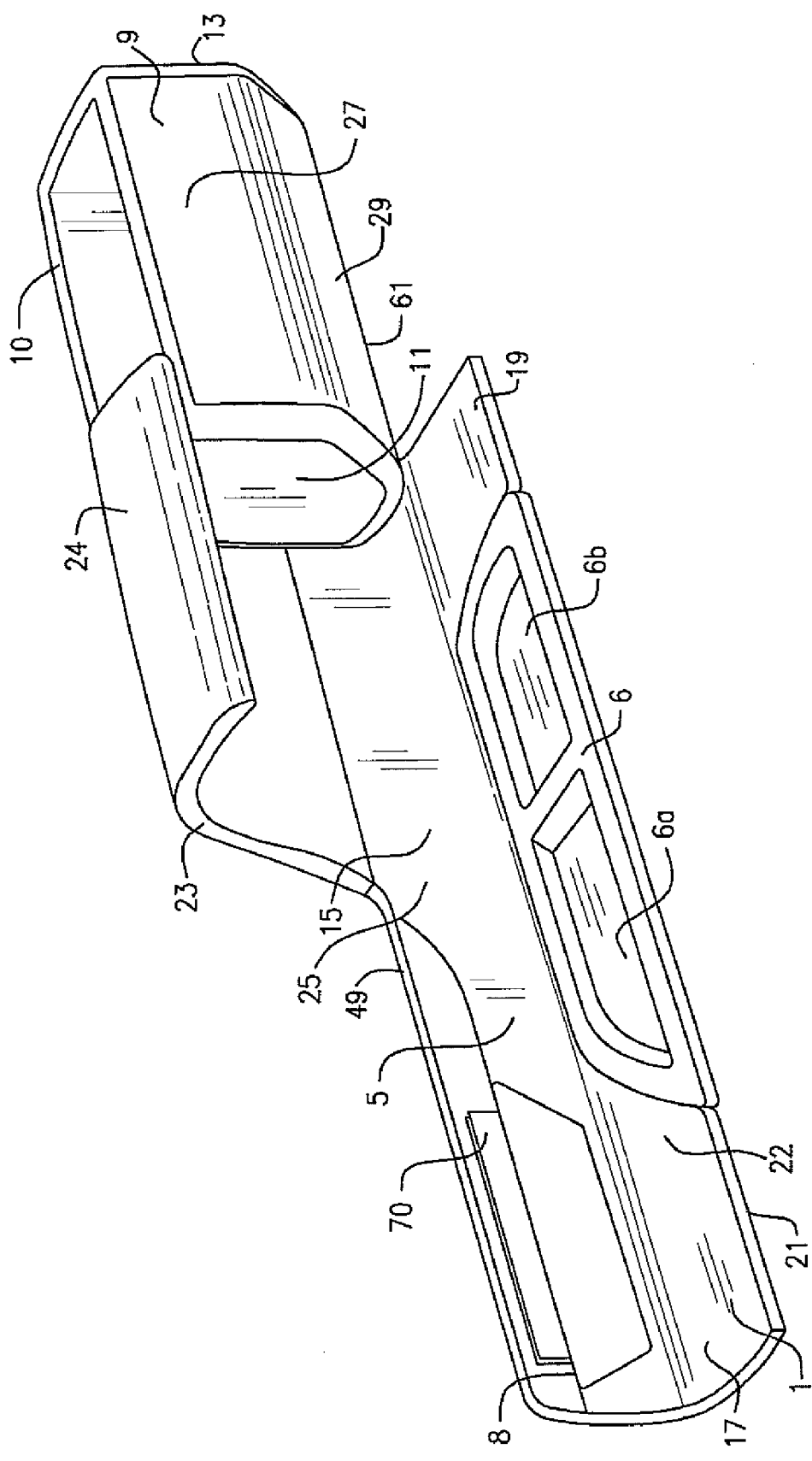
FIG. 5 is a perspective view of the vehicle interior assembly employing a console, a C-shaped side-wall, a tray, and a sliding storage bin in a rearward open position such that the bin extends beyond a terminal end of the console in accordance with at least one aspect of the present invention.
Figure 6:
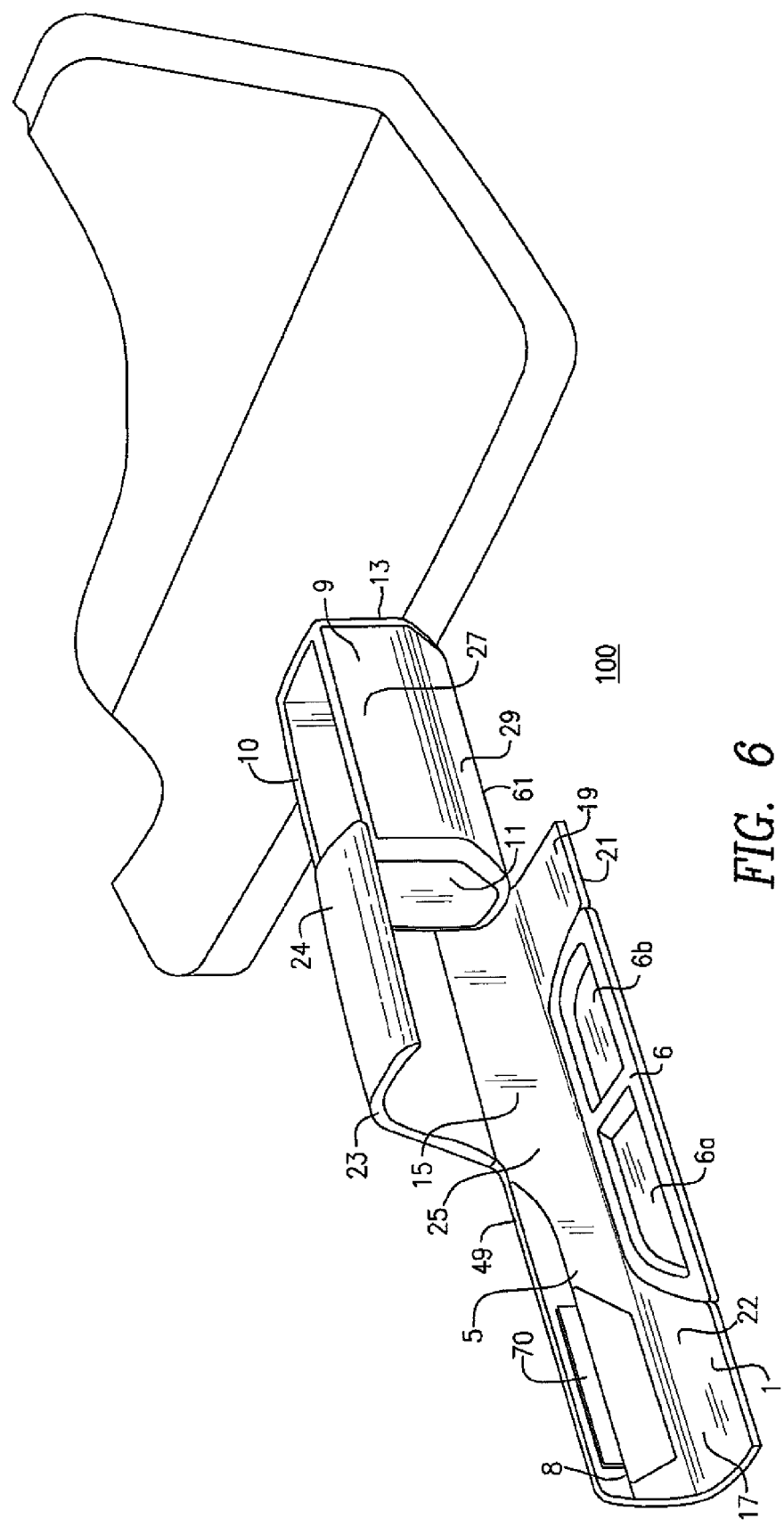
FIG. 6 is a perspective view of the vehicle interior assembly employing a console, a C-shaped side-wall, a tray, and a sliding storage bin in a rearward open position such that the bin extends beyond a terminal end of the console for use by a backseat passenger(s) in accordance with at least one aspect of the present invention.
Figure 9:
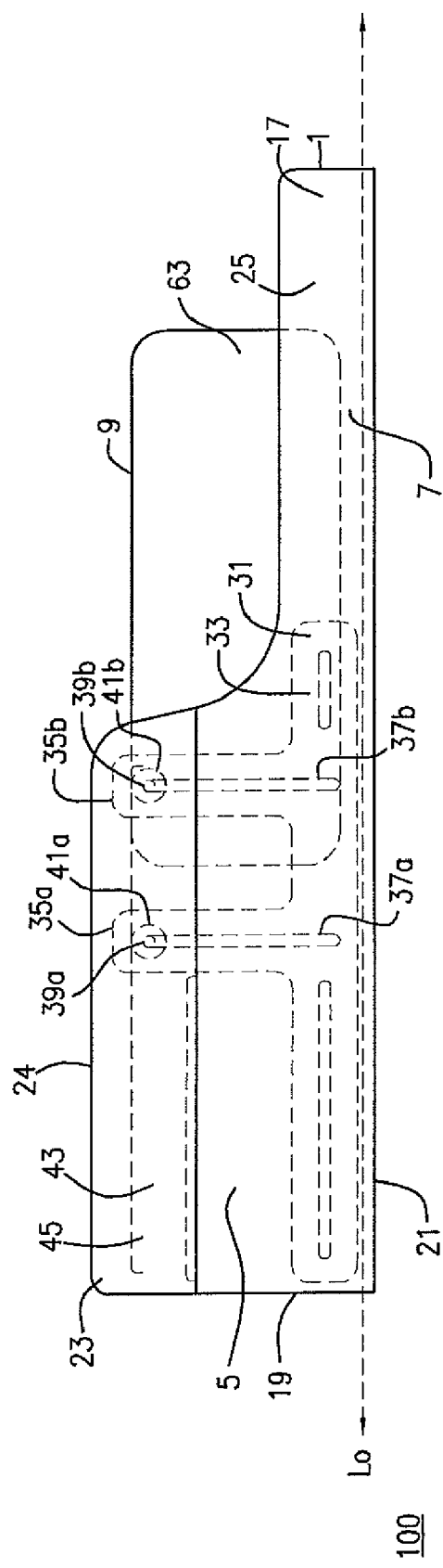
FIG. 9 is a side view of the vehicle interior assembly in accordance with at least one aspect of the present invention.
Figure 10:
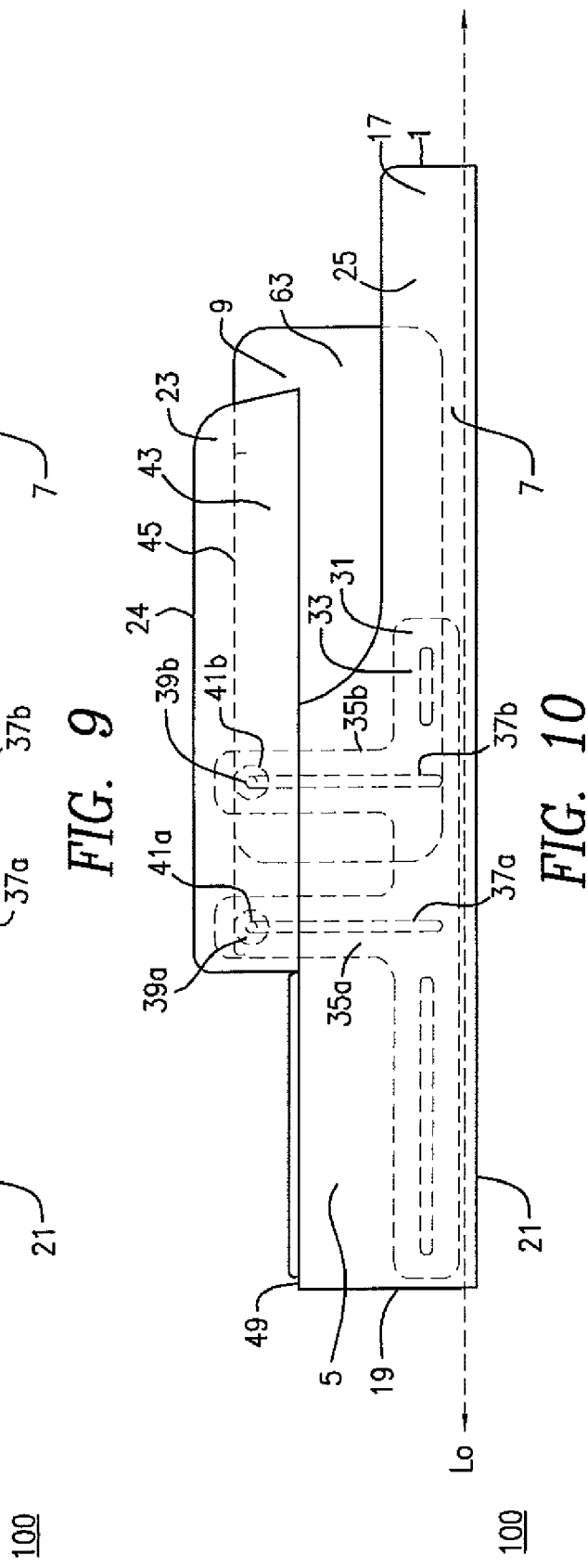
FIG. 10 is a side view of the vehicle interior assembly of FIG. 4 in accordance with at least one aspect of the present invention.

As shown in FIGS. 1 and 4, the lid 24 may cover and uncover the at least one sliding bin 9 at various portions along the side-wall 5. When the lid 24 and the sliding bin 9 are both slidingly engaged to the side-wall 5, the lid 24 may cover the sliding bin 9 at various positions, particularly if a user moved the sliding bin 9. For instance, if a user moves the sliding bin 9 from a first position underneath the lid 24 in a frontwards direction to a second position, the lid 24 must be moved to that second position to cover the bin 9 while the bin 9 remains in the second position. Because the lid 24 and the bin 9 may be moved to various positions along the length of the side-wall 5, the lid 24 may thus cover the bin 9 at those various positions along the side-wall 5. Alternatively, the bin 9 may be moved to various positions to avoid such cover by lid 24. As such, the assembly 100 provides a user with the ability to arrange the lid 24 and/or the bin 9 in a plurality of arrangements.

As shown in FIGS. 1-6, the side-wall 5 of console 1 may further include at least one storage pocket 8 (also referred to as a folder). A user may use the storage pocket 8 for placing items, such as, books, digital media, writing utensils, papers 70, etc. The at least one storage pocket 8 may be disposed on the surface 15 of the lower portion 25 of the side-wall 5. Additionally or alternatively, any other method or arrangement of folders, such as slits, grooves, etc., known to those skilled in the art may be employed in various locations such as on the upper portion 23, lower portion 25, console 1, etc. The at least one storage pocket 8 may be formed from various materials, such as metal, plastic, polymer, rubber, metal embedded in plastic, paper, fabric, etc.

In at least one embodiment as best seen in FIGS. 1-6, a width of the at least one storage bin 9, the upper portion 23, and/or the lower portion 25 may be equal to or less than a width of the console 1 such that the storage bin 9, the upper portion 23, and/or the lower portion 25 does not extend beyond the console 1. Such embodiments employ fewer materials to save on costs while creating space for additional storage and improved ergonomics. In at least a further embodiment, the at least one storage bin 9, the upper portion 23, and/or the lower portion 25 may be wider than the console 1 while still improving ergonomics and space availability.

Figure 13:
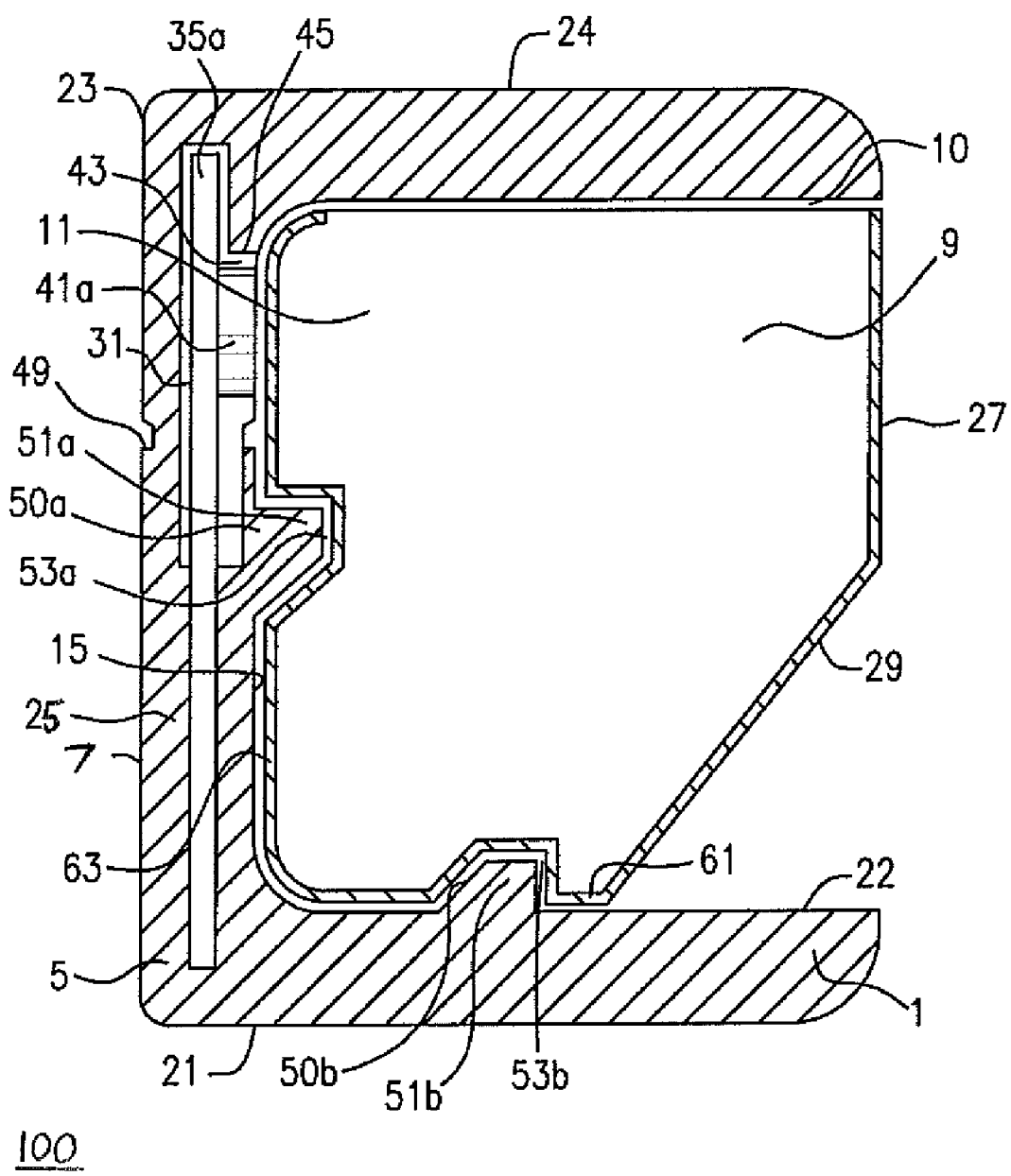
FIG. 13 is a cross-sectional view of the vehicle interior assembly taken along line 13-13 of FIG. 7 in accordance with at least one aspect of the present invention.

As shown in FIGS. 7-13, the lid 24 and the upper portion 23 may be slidingly engaged to the side-wall 5 via at least one bracket system 31. As best seen in FIG. 13, the upper portion 23 may include a channel 43 in communication with at least one roller 41a, 41b, which is disposed on the bracket system 31. Those skilled in the art will recognize that any mechanism may be used to slidingly engage the upper portion 23 to the lower portion 25, such as, with a bracket system 31, sliding rail(s), connection elements, a combination thereof, etc.

As best seen in FIGS. 7-13, the bracket system 31 may comprise a first bracket extension 33, at least one second bracket extension 35a, 35b, and at least one roller 41a, 41b. The at least one second bracket extension 35a, 35b may extend transversely from the first bracket extension 33 such that the bracket system 31 is substantially F-shaped. The at least one roller 41a, 41b may be rotationally engaged to the at least one second bracket extension 35a, 35b via at least one pin 39a, 39b. The at least one second bracket extension 35a, 35b may include at least one slot 37a, 37b, respectively, to permit the at least one pin 39a, 39b to engage therethrough and attach the at least one roller 41a, 41b thereon. The first bracket extension 33, and the at least one second bracket extension 35a, 35b may be disposed within the lower portion 25 of the side-wall 5 such that the at least one second bracket extension 35a, 35b and the at least one roller 41a, 41b of the bracket system 31 may extend substantially upwards into the channel 43 of upper portion 23. The bracket system 31 provides structural support to the upper portion 23 and to the lower portion 25 of side-wall 5 when situated within the side-wall 5. The bracket system 31 may support a load of any predetermined amount, such as tens of pounds, hundreds of pounds, etc. Additionally, the bracket system 31 may stiffen the console 1 to provide additional structure support to the console 1 such that only one side-wall 5 is needed to support the at least one storage bin 9 and/or the lid 24. As shown in FIGS. 7-13, the F-shaped bracket system 31 stiffens the console 1 so that at least one second side-wall is not needed to support the assembly 100. One or more of the components of the bracket system 31, such as the first bracket extension 33, the at least one second bracket extension 35a, 35b, the at least one roller 41a, 41b, pin 39a, 39b, etc., may be formed from various materials, such as metal, plastic, polymer, rubber, metal embedded in plastic, etc.

As mentioned above, the channel 43 may permit the partial or complete insertion of the at least one second bracket extension 35a, 35b and the at least one roller 41a, 41b, and the channel 43 may extend substantially along the length of the upper portion 23. The channel 43 may be sized and shaped to allow the at least one roller 41a, 41b to spin or roll therein such that the upper portion 23 (and thus the lid 24) may slide forwards or rearwards via the at least one roller 41a, 41b. The channel 43 may include a rail 45 such that the at least one roller 41a, 41b rolls along the rail 45 as the upper portion 23 moves forwards and rearwards. Additionally or alternatively, any other method or arrangement of channels, such as sliding rails, etc., known to those skilled in the art may be employed. The channel 43 may be integrally molded into the upper portion 23. The channel 43 may be molded within various materials, such as metal, plastic, polymer, rubber, metal embedded in plastic, etc.

As shown in FIGS. 7-13, the at least one storage bin 9 may slidingly engage the first surface 15 of the lower portion 25 of the side-wall 5 that is adjacent to the at least one storage bin 9, for example when the side-wall 5 is C-shaped (as best seen in FIG. 13). Alternatively or additionally, the at least one storage bin 9 may slidingly engage the first surface 15, and a second surface 22 of the console 1 that is underneath the at least one storage bin 9, for instance when the side-wall 5 is C-shaped.

As shown in FIGS. 7-13, the at least one storage bin 9 may be slidingly engaged to the side-wall 5 via at least one tongue-groove system(s) 50a, 50b. In accordance with at least one embodiment as best seen in FIG. 13, the lower portion 25 of the side-wall 5 may include a first tongue 51a in communication with a first groove 53a of the at least one storage bin 9. The first groove 53a may be proximate to a side 63 of the at least one storage bin 9. The console 1 may include a second tongue 51b extending from the surface 22 of the console 1 in communication with a second groove 53b of the at least one storage bin 9. The second groove 53b may be proximate to a base 61 of the at least one storage bin 9. Gravity holds the at least one storage bin 9 onto the first and/or second tongues 51a, 51b. Alternatively or additionally, the geometry (e.g., the transverse orientation of the pair of the tongue and groove structures 51, 53) of the tongue-groove pairings 50a, 50b (also referred to as tongue-groove systems) holds the at least one storage bin 9 in place and allows a user to slide the at least one storage bin 9 along the console 1. The first and second tongues 51a, 51b may extend substantially along the length of the side-wall 5, and the first and second grooves 53a, 53b may extend substantially along the length of the at least one storage bin 9. The first and second grooves 53a, 53b may be sized and shaped to prevent the at least one storage 9 from sliding beyond a predetermined distance. The tongue 51a may be integrally molded into the surface 15 of the side-wall 5, and the tongue 51b may be integrally molded into the surface 22 of the console 1. Additionally or alternatively, any other method or arrangement of tongues and grooves, such as male and female mating components, etc., known to those skilled in the art may be employed. The tongues 51a, 51b may be formed from various materials, such as metal, plastic, polymer, rubber, metal embedded in plastic, etc.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A vehicle interior assembly (100), comprising:
   a console (1) having front and rear terminal ends (17,19) defining a longitudinal axis (Lo) of the console (1), said console including a single side-wall (5) extending upwardly away from an underside (21) of said console (1); and
   a storage bin (9) having at least a base (61), a first side-wall (63), and a second side-wall (27) located opposite said first sidewall (63), wherein said first side-wall (63) slidingly engages said side-wall (5) of said console (1) such that said storage bin (9) slides relative to said side-wall (5) in frontward and rearward directions substantially parallel to the longitudinal axis (Lo) of said console (1).

2. The vehicle interior assembly (100) set forth in claim 1, wherein said side-wall (5) has an upper portion (23) and a lower portion (25), and wherein said upper portion (23) further comprises a lid (24) that covers said storage bin (9) when said storage bin (9) is in a closed position.

3. The vehicle interior assembly (100) set forth in claim 2, wherein said upper portion (23) and said lid (24) slide in the frontward and rearward directions relative to said lower portion (25).

4. The vehicle interior assembly (100) set forth in claim 2, wherein said storage bin (9) slides in the frontward and rearward directions relative to said lower portion (25).

5. The vehicle interior assembly (100) set forth in claim 4, wherein said storage bin (9) slides in the frontward and rearward directions relative to said upper portion (23) and said lid (24).

6. The vehicle interior assembly (100) set forth in claim 2, wherein said upper portion (23) is integrally molded to said lower portion (25) such that said upper portion (23) and said lid (24) do not slide relative to said lower portion (25).

7. The vehicle interior assembly (100) set forth in claim 2, wherein said console (1), including said side-wall (5) and said lid (24) is substantially C-shaped when viewed in cross-section to the longitudinal axis (Lo) of said console (1).

8. The vehicle interior assembly (100) set forth in claim 1, wherein said console (1) further includes at least one storage tray (6, 6a, 6b), at least one storage pocket (8), or both.

9. The vehicle interior assembly (100) set forth in claim 1, wherein said side-wall (5) is proximate said first side-wall (63) of said storage bin (9) and wherein said console (1) has no side-wall proximate said second side-wall (27) of said storage bin (9).

* * * * *